United States Patent [19]
Lewis

[11] Patent Number: 6,030,919
[45] Date of Patent: Feb. 29, 2000

[54] PLATINUM HYDROSILYLATION CATALYST AND METHOD FOR MAKING

[75] Inventor: Larry Neil Lewis, Scotia, N.Y.

[73] Assignee: General Electric Company, Schenectady, N.Y.

[21] Appl. No.: 09/133,397

[22] Filed: Aug. 13, 1998

[51] Int. Cl.[7] .............................. B01J 31/00; B01J 27/06; B01J 21/06
[52] U.S. Cl. .......................... 502/158; 502/224; 502/229; 502/230; 502/232; 502/240; 502/258; 502/261; 502/262
[58] Field of Search .................................... 502/224, 229, 502/230, 232, 240, 258, 261, 262, 158

[56] References Cited

U.S. PATENT DOCUMENTS 3,419,593  12/1968  Williug .
3,715,334   2/1973  Karstedt .
5,789,334   8/1998  Nakanishi et al. ...................... 502/159

OTHER PUBLICATIONS

"Advances in Organometallic Chemistry", by J. L. Spier, vol. 17, F.G.A. Stone, R. West, Eds. (Academic Press, NY 1979) pp. 407–447, no month available.

*Primary Examiner*—Elizabeth D. Wood
*Attorney, Agent, or Firm*—Noreen C. Johnson; Douglas E. Stoner

[57] ABSTRACT

A method is provided for making a platinum hydrosilylation catalyst by equilibrating a mixture of an alkenylpolysiloxane and a cycloalkylpolysiloxane in the presence of a haloplatinic acid and thereafter treating the resulting equilibrate with a base. Improved rate of cure and a reduction in ppm levels of platinum required to effect hydrosilylation are achieved.

10 Claims, No Drawings

PLATINUM HYDROSILYLATION CATALYST AND METHOD FOR MAKING

FIELD OF THE INVENTION

The present invention relates to a method for making a platinum hydrosilylation catalyst by heating a mixture of organopolysiloxane having alkenyl radicals, such as vinyl radicals, attached to silicon by carbon-silicon bonds, and cyclodialkylpolysiloxane in the presence of haloplatinic acid, and thereafter treating the resulting equilibrate with base. The resulting platinum hydrosilylation catalyst exhibits higher hydrosilylation catalyst activity when compared to products obtained by heating a mixture of haloplatinic acid and alkenylsiloxane substantially free of cyclodialkylpolysiloxane.

DISCUSSION OF THE PRIOR ART

As shown by Karstedt, U.S. Pat. No. 3,715,334, platinum-vinylsiloxanes are described which are made by effecting removal of chemically combined halogen from a platinum halide-vinylsiloxane reaction product. While the Karstedt catalyst has been found to be highly effective as a hydrosilylation catalyst, additional improvements in platinum catalyst activity is of significant interest to the organosilicon industry. Platinum catalysts useful in hydrosilylation reactions are also shown by Willing, U.S. Pat. No. 3,419,593, and in the discussions of J. L. Spier, Advances in Organometallic Chemistry, Vol. 17, F. G. A. Stone, R. West, Eds.( Academic Press, N.Y.1979) pp 407–447.

SUMMARY OF THE INVENTION

The present invention is based on the discovery that improvements in hydrosilylation platinum catalyst performance, in terms of such factors as reduced cure time, and reduced ppm of platinum needed, or both, can be achieved by treating certain reaction products of haloplatinic acid, alkenylsiloxane and cycloalkylpolysiloxane with a base. It has been found that platinum catalyst activity enhancement can be achieved if a mixture of the alkenylsiloxane and cycloalkylpolysiloxane is heated in the presence of haloplatinic acid for a time sufficient to effect equilibration of the mixture, followed by base treatment to effect substantial elimination of halogen radicals attached to platinum.

STATEMENT OF THE INVENTION

There is provided by the present invention, a method for making a platinum hydrosilylation catalyst, which comprises the steps of:

1) agitating a mixture comprising haloplatinic acid, alkenylpolysiloxane and cycloalkylpolysiloxane at a temperature and for a duration which is sufficient to effect the equilibration of the resulting organopolysiloxane-platinum halide reaction product, 2) treating the equilibrate of step 1) with sufficient base to effect the substantial removal of halogen chemically combined with platinum, and, 3) filtering the mixture of 2) to provide recovery of a platinum hydrosilylation catalyst, where prior to the equilibration of the initial mixture of 1), there is utilized per mole of haloplatinic acid, sufficient moles of alkenylpolysiloxane to provide at least one mole of alkenylsiloxy unit, per/atom of platinum, and sufficient cycloalkylpolysiloxane, to provide from about 0.30 mole to about 20 moles of cycloalkylpolysiloxane, per mole of alkenylpolysiloxane.

DETAILED DESCRIPTION OF THE INVENTION

Included among the alkenylpolysiloxanes which can be used to make the platinum hydrosilylation catalyst of the present invention, are organopolysiloxanes having from 2 to about 30 chemically combined diorganosiloxy units, which include at least one alkenylsiloxy unit of the formula, $$[(R)_x(H)_yC=CH]_a(R^1)_b SiO_{[4-(a+b)]}$$ (1)

where R is a $C_{(1-3)}$ mono valent alkyl radical, $R^1$ is a $C_{(1-12)}$ monovalent hydrocarbon radical free of aliphatic unsaturation, "x" is a whole number equal to 0 or 1, "y" is an integer equal to 1 or 2, and the sum of x+y is equal to 2, "a" is an integer having a value of 1 to 3 inclusive, "b" is a whole number having a value of 0 to 2 inclusive, and the sum of a+b has a value of 2 or 3.

$R^1$ is more particularly selected from $C_{(1-8)}$ alkyl, such as methyl, ethyl, propyl, and butyl; cycloaliphatic, such as cyclopentyl, and cyclohexyl; aryl such as phenyl, tolyl, xylyl and napthyl.

Among the alkenylpolysiloxanes having chemically combined units of formula (1), there are preferably included for example, vinyl disiloxanes, such as 1,3 divinyl-tetramethyldisiloxane, hexavinyldisiloxane, sym-divinyl-tetraphenyldisiloxane, and sym-tetravinyldimethyldisiloxane. In addition, polydiorganosiloxanes, and cyclopolydiorgansiloxanes are also included having vinyl radicals attached to silicon by carbon-silicon bonds, and from 3 to 10 chemically combined diorganosiloxy units, or terminal triorganosiloxy unit and consist essentially of dimethylsiloxy units, and methylvinylsiloxy units.

Among the cycloalkylpolysiloxane which can be used in the practice of the invention, there are preferably included cyclic polydimethylsiloxane having from about 3 to 20 chemically combined dimethylsiloxy units. Some of the cycloalkylpolysiloxane which are particularly preferred are hexamethylcyclotrisiloxane and octamethylcyclotetrasiloxane.

Among the haloplatinic acids which can be used in the practice of the invention, there are included chloroplatinic acid, $H_2PtCl_6$, and metal salts thereof, such as the corresponding sodium and potassium salts. In addition, platinous type halides and halide complexes with aliphatic hydrocarbons, as set forth in the above referenced Karstedt patent, U.S. Pat. No. 3,715,334 which is incorporated herein by reference.

In the practice of the method of the present invention, initially, equilibration of the alkenylpolysiloxane-cycloalkylpolysiloxane mixture is effected by agitating, such as stirring, the mixture for about 0.5 to about 24 hours, at a temperature of about 25° C. to about 90° C. in the presence of an inert organic solvent and haloplatinic acid. Suitable inert organic solvents are for example, aliphatic alcohols, such as $C_{(1-4)}$ primary hydroxy alkyl compounds, such as methanol, ethanol, and propanol.

The resulting equilibration mixture is thereafter treated with a sufficient amount of a suitable base to effect removal of chemically combined halogen from platinum. While most basic compounds can be used, which can yield hydroxyl ions in an aqueous solution, such as alkali metal hydroxides, alkali metal bicarbonates, for example, sodium bicarbonate are particularly preferred. The mixture can then be filtered to effect removal of unreacted ingredients, to facilitate catalyst recovery.

In order that those skilled in the art will be better able to practice the present invention, the following example is given by way of illustration and not by way of limitation. All parts are by weight unless stated otherwise.

EXAMPLE

A mixture of 60.40 g of 1,3 divinyltetramethyldisiloxane, 22.9 g of octamethylcyclotetrasiloxane, 10.70 g of $H_2PtCl_6$, and 32.50 g of ethanol, was stirred and heated to 70° C. for one hour, while being protected from light. There was then added 14.5 g of sodium bicarbonate to the resulting equilibration mixture. The resulting mixture was then heated and stirred for an additional hour. The solution was then filtered and the filter cake was washed with two 8 g aliquots of a mixture of 15.5 g of 1,3 divinyltetramethyldisiloxane, and 6 g of octamethylcyclotetrasiloxane. Based on method of preparation, there was obtained a vinylorganopolysiloxane equilibrate having chemically combined platinum, and referred to hereinafter as Pt Equilibration Catalyst.( Pt Equil Cat)

The above procedure was repeated, except that sodium bicarbonate was initially employed in the starting reaction mixture, and octamethylcyclotetrasiloxane was excluded from the reaction. After two hours of heating at 70° C., the resulting solution was filtered to remove the sodium bicarbonate, and the filter cake was then washed with two 8 g aliquots of 1,3 divinyltetramethyldisiloxane. Based on method of preparation, there was obtained a platinum-vinylsiloxane hydrosilylation catalyst, and referred to hereinafter as Karstedt catalyst (K cat).

The procedure for preparing the Karstedt catalyst was repeated, except that sodium bicarbonate was introduced into the reaction mixture one hour after the heating of the mixture was started. Based on method of preparation, there was obtained a platinum-vinylsiloxane hydrosilylation catalyst, and referred to hereinafter as modified Karstedt catalyst (Mod K cat)

The relative catalytic activity of the various catalysts was determined by measuring the G'/G" cross-over point using a Rheometrics Model RDS 7700 dynamic mechanical analysis (DMS) instrument. The (DMS) instrument was set at 10 rad/sec with a strain of 2.0 at 26° C. A test cure system was composed of a mixture of 24.79 g of a polydimethylsiloxane having terminal dimethylvinylsiloxy units and 0.21 g of 1,3 dihydrotetramethyldisiloxane.

Each of the above Pt catalysts were then respectively combined with 25 g of trimethylsiloxy terminated pentadimethylsiloxane ($D_5$) A sufficient amount of the above respective Pt catalyst solutions mixtures were used so that 200 microliters of the $D_5$ solution would provide 5 ppm Pt to the test cure mixture. The G'/G" cross-over point was used to determine cure time. The following results were obtained:

| Catalyst | % Pt | Amount of Catalyst Solution (mg) | G'/G" cross-over time (sec) |
|---|---|---|---|
| Pt Equil Cat | 2.9 | 538 | 600,611 |
| K cat | 3.4 | 459 | 676,702 |
| Mod K cat | 3.4 | 459 | 676,702 |

The above results show that the Pt Equilibration Catalyst had the shortest cure time and accordingly, was the most active.

What is claimed is:

1. A method for making a platinum hydrosilylation catalyst, which comprises the steps of:

1) agitating a mixture comprising haloplatinic acid, alkenylpolysiloxane and cycloalkylpolysiloxane at a temperature and for a duration which is sufficient to effect the equilibration of the resulting organopolysiloxane-platinum halide reaction product, 2) treating the equilibrate of step 1) with sufficient base to effect the substantial removal of halogen chemically combined with platinum, and, 3) filtering the mixture of 2) to provide recovery of a platinum hydrosilylation catalyst, where prior to the equilibration of the initial mixture of 1), there is utilized per mole of haloplatinic acid, sufficient moles of alkenylpolysiloxane to provide at least one mole of alkenylsiloxy unit, per/atom of platinum, and sufficient cycloalkylpolysiloxane, to provide from about 0.3 mole to about 20 moles of cycloalkylpolysiloxane, per mole of alkenylpolysiloxane.

2. The method of claim 1, where the haloplatinic acid is chloroplatinic acid.

3. The method of claim 1, where the alkenylpolysiloxane is 1,3 divinyltetramethyldisiloxane.

4. The method of claim 1, where the cycloalkylpolysiloxane is octamethylcyclotetrasiloxane.

5. The method of claim 1, where the base is an alkali metal bicarbonate.

6. A platinum hydrosilylation catalyst made by the method of claim 1.

7. A hydrosilylation catalyst in the form of a base treated equilibrated reaction product of haloplatinic acid, alkenylpolysiloxane, and cycloalkylpolysiloxane, which is substantially free of halogen chemically combined to platinum.

8. A hydrosilylation catalyst in accordance with claim 7, where the haloplatinic acid is chloroplatinic acid.

9. A hydrosilylation catalyst in accordance with claim 7, where the alkenylpolysiloxane is 1,3 divinyltetramethyldisiloxane.

10. A hydrosilylation catalyst in accordance with claim 7, where the cycloalkylpolysiloxane is octamethylcyclotetrasiloxane.

* * * * *